United States Patent
Michioka et al.

(10) Patent No.: US 8,282,282 B2
(45) Date of Patent: Oct. 9, 2012

(54) MOTION GUIDE DEVICE AND METHOD OF ASSEMBLING MOTION GUIDE DEVICE

(75) Inventors: Hidekazu Michioka, Tokyo (JP); Hiroshi Niwa, Tokyo (JP); Hiroaki Mochizuki, Tokyo (JP); Takuya Yamagata, Tokyo (JP); Takuya Horie, Tokyo (JP)

(73) Assignee: THK Co., Ltd., Tokyo (JP)

( * ) Notice: Subject to any disclaimer, the term of this patent is extended or adjusted under 35 U.S.C. 154(b) by 1062 days.

(21) Appl. No.: 11/915,344

(22) PCT Filed: May 23, 2006

(86) PCT No.: PCT/JP2006/310190
§ 371 (c)(1),
(2), (4) Date: Sep. 12, 2008

(87) PCT Pub. No.: WO2006/126508
PCT Pub. Date: Nov. 30, 2006

(65) Prior Publication Data
US 2009/0169139 A1  Jul. 2, 2009

(30) Foreign Application Priority Data
May 24, 2005 (JP) .................. 2005-151472

(51) Int. Cl.
*F16C 29/06* (2006.01)
*F16C 29/12* (2006.01)
*B23P 11/00* (2006.01)

(52) U.S. Cl. ............ 384/45; 384/40; 384/42; 384/54; 29/434

(58) Field of Classification Search .......... 384/7, 38–45, 384/54, 57; 29/434, 898.03
See application file for complete search history.

(56) References Cited

U.S. PATENT DOCUMENTS
4,231,621 A * 11/1980 Teramachi ............ 384/45
4,643,591 A * 2/1987 Schwarz ............... 384/44
(Continued)

FOREIGN PATENT DOCUMENTS
JP  61-116119 A  6/1986
(Continued)

OTHER PUBLICATIONS
International Search Report of PCT/JP2006/310190, date of mailing Aug. 22, 2006.
(Continued)

*Primary Examiner* — Marcus Charles
(74) *Attorney, Agent, or Firm* — Westerman, Hattori, Daniels & Adrian, LLP

(57) ABSTRACT

A motion guide device is able to damp a moving block from vibrating in a direction perpendicular to an axis of a raceway rail. A damping plate with a surface facing a surface of a raceway is provided at a moving block body. The surface of the damping plate is set to be in contact with the raceway rail or is set such that a gap between its surface of the raceway rail is as close to zero as possible. When vibration occurs from the raceway rail or the moving block, the surface of the raceway rail and the surface of the damping plate come into contact with each other. This brings about change in a spring constant of the motion guide device in the direction perpendicular to the axis of the raceway.

4 Claims, 11 Drawing Sheets

U.S. PATENT DOCUMENTS

| | | | |
|---|---|---|---|
| 4,662,762 A * | 5/1987 | Schwarz | 384/44 |
| 4,730,945 A * | 3/1988 | Luther et al. | 384/57 |
| 4,773,770 A * | 9/1988 | Osawa et al. | 384/45 |
| 4,940,339 A | 7/1990 | Amano | |
| 4,957,376 A * | 9/1990 | Ward, Jr. | 384/57 |
| 5,011,300 A | 4/1991 | Teramachi | |
| 5,181,780 A * | 1/1993 | Morita | 384/8 |
| 5,267,796 A * | 12/1993 | Nonaka et al. | 384/43 |
| 5,268,970 A * | 12/1993 | Tanaka | 384/43 |
| 5,281,029 A | 1/1994 | Morita | |
| 7,029,214 B2 * | 4/2006 | Shiba et al. | 384/7 |
| 2004/0151408 A1 | 8/2004 | Chuo | |

FOREIGN PATENT DOCUMENTS

| | | |
|---|---|---|
| JP | 1989-99541 U | 7/1989 |
| JP | 2-51619 A | 2/1990 |
| JP | 1992-17511 U | 2/1992 |
| JP | 5-60129 | 3/1993 |
| JP | 7-145849 A | 6/1995 |
| JP | 8-270646 A | 10/1996 |
| JP | 10-15761 A | 1/1998 |
| JP | 11-280995 A | 10/1999 |
| SU | 1214944 A | 2/1986 |

OTHER PUBLICATIONS

Supplementary European Search Report dated Jan. 27, 2012, issued in corresponding European Patent Application No. 06746724.1.

* cited by examiner

Enlarged view of II part

Section taken along III-III line

Section taken along A-A line

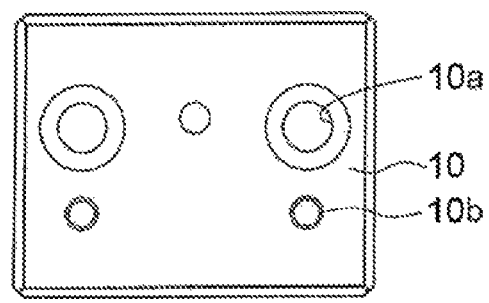
FIG.7A
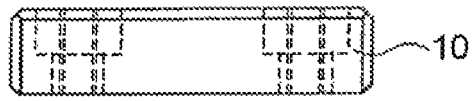
FIG.7B
FIG.8A
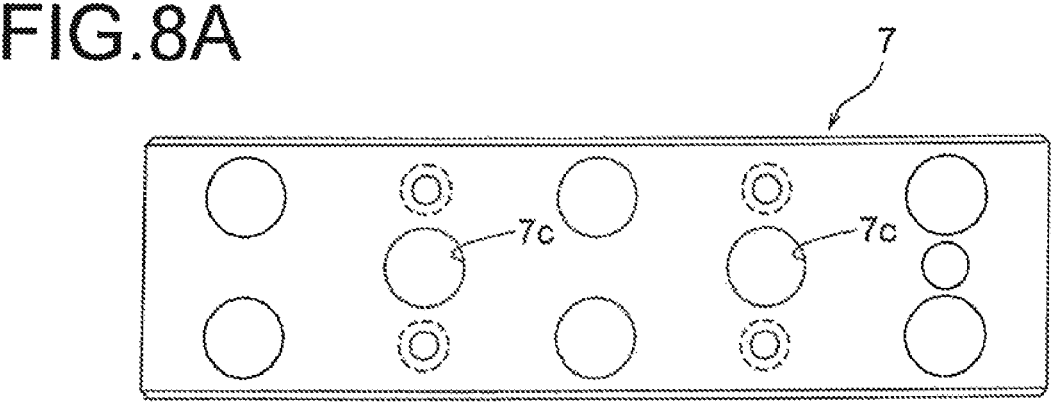
FIG.8B
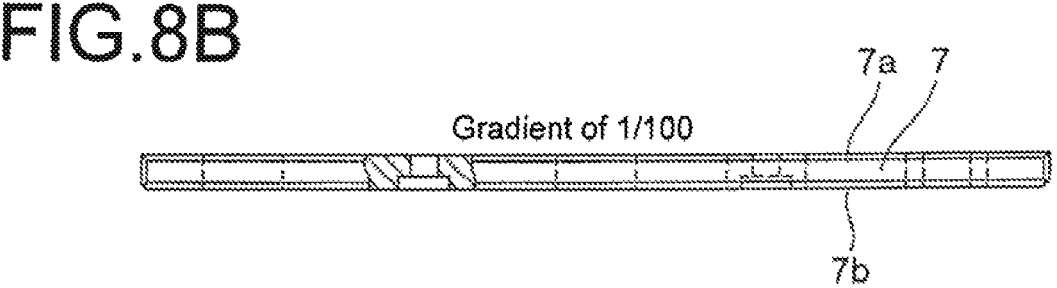

Enlarged view of XII part

Section taken along XIII-XIII line

Enlarged view of XIV part

MOTION GUIDE DEVICE AND METHOD OF ASSEMBLING MOTION GUIDE DEVICE

CROSS-REFERENCE TO RELATED APPLICATIONS

This application claims priority of International Application PCT/JP2006/310190 filed May 23, 2006, which claims priority of Japanese application JP2005-151472, filed May 24, 2005, the entire contents of which are hereby incorporated by reference.

TECHNICAL FIELD

The present invention relates to a motion guide device, such as a linear guide and a ball spline, which guides a moving object, and in particular, to a rolling-type motion guide device with a guide mechanism that uses, as an inclusion, rolling elements such as balls or rollers to reduce friction coefficient thereof.

BACKGROUND ART

The rolling-type motion guide device, which comprises a guide mechanism in which rolling elements are incorporated as an inclusion, is advantageous in that its motion is smoother than that of a sliding-type motion guide device. For this reason, the rolling-type motion guide device has been used in a wide variety of applications such as machine tools, semiconductor/liquid display manufacturing apparatuses, and robots. One example of use of such a rolling-type motion guide device is shown in FIG. 15, in which the device is used at the Z-axis of a vertical machining center. In this example, a motion guide device 22 is able to guide the linear motion of a driver 24 along the Z-axis relative to a base 23, in which the driver 24 rotates a machine tool 21.

However, when the rolling-type motion guide device 22 is used for the Z-axis of this kind of machining center, there may occur vibration at the motion guide device 22 during the machining operation. This vibration, if occurring, is magnified at the machine tool 21 located at the distal end of the driver 24, which gives rise to a problem of poor surface-machining accuracy. For the machine tool 21, the vibration forces the machine tool 21 to strongly touch the workpiece surface, thus bringing about a problem that the lifetime of the machine tool 21 is reduced. To cope with these problems, instead of the rolling-type motion guide device, a sliding-type motion guide device is sometimes used which provides higher damping performance.

As a matter of course, use of the sliding-type motion guide device cannot enjoy the merit of gaining smoother motions given by the rolling-type motion guide device. In order to improve the damping performance while still keeping the greatest benefit of smoother motions of the rolling-type motion guide device, there has been known a technique shown in FIG. 16, in which a squeeze film damper 27 is formed between a raceway rail 25 and a moving block 26 such that the squeeze film damper 27 damps the moving block from vibrating (refer to Patent Reference 1, the second page). According to the fluid damping technique using this squeeze film damper 27, the moving block 26 has formed thereon a first sliding surface 28 facing an upper surface of the raceway rail 1 and a second sliding surface 29 facing a lower surface of a swelled wall of the raceway rail 1. Between the first and second sliding surfaces 28 and 29 and the raceway rail 1, a gap t of several tens of micrometers (μm) or thereabouts is formed and fully charged with oil, which functions as the squeeze film damper.

[Patent Reference 1] Japanese Patent Laid-open Publication No. 5-60129.

In the fluid damping technique using the squeeze film damper 27, resistance occurs when the moving block vibrates in the axial direction of the raceway rail so that the vibration in the axial direction of the moving block can be damped. However, this technique is not effective for damping the vibration of the moving block in the direction perpendicular to the axial direction. The present inventors have found that vibration resulting in a problem of the motion guide device applied to the Z-axis of the machining center is vibration generated in the perpendicular direction to the axial direction of the raceway rail. The vibration in the direction perpendicular to the axial direction is generated when a workpiece is under machining work and the moving block is stopped or moving at slower speeds. The problematic vibration is generated due to the fact that the rolling elements behave like a spring.

SUMMARY OF THE INVENTION

Therefore, the present invention has an object of providing a motion guide device that is able to damp the vibration of the moving block generated in the direction perpendicular to the axial direction of the raceway rail.

The present invention will now be described below. In the following, reference numerals appearing in the accompanying drawings may be added in brackets to components for easy understanding of the present invention, however this is not for limiting the present invention to the modes shown in the drawings.

In order to solve the foregoing problem, motion guide device includes: a raceway member having a rolling-element rolling groove formed thereon; a moving member body having a loaded rolling-element rolling groove formed facing the rolling-element rolling groove and having a non-loaded return path formed thereon; a cover member attached to each of both ends of the moving member body in a traveling direction thereof and having a direction changing path formed connecting the loaded rolling-element rolling groove and the non-loaded return path; a plurality of rolling elements accommodated in a rolling-element circulation path including the loaded rolling-element rolling groove of the moving member body; and a damping plate, provided at the moving member body, having a surface facing a surface of the raceway member, the surface of the damping plate being set to be in contact with the raceway member or set such that a gap (δ) between the surface of the damping plate and the raceway member is set to be as close to zero as possible, in which, when the moving member body vibrates relative to the raceway member in a crossing direction crossing a longitudinal direction of the raceway member, the surface of the damping plate and the surface of the raceway member are in contact with each other to make the moving member body damped from vibrating relative to the raceway member in the crossing direction.

The motion guided device described above, further includes a gap adjustment plate, provided between the moving member body and the damping plate, for adjusting the gap between the damping plate and the raceway member.

Further, the motion guided device described above includes, the moving member body and the gap adjustment plate have matching surfaces given gradients, respectively, and the gap between the damping plate and the raceway member is adjusted by moving the gap adjustment plate relative to the moving member body.

Additionally, a motion device includes: a raceway member having a rolling-element rolling groove formed thereon; a moving member body having a loaded rolling-element rolling groove formed facing the rolling-element rolling groove and having a non-loaded return path formed thereon; a cover member attached to each of both ends of the moving member body in a traveling direction thereof and having a direction changing path formed connecting the loaded rolling-element rolling groove and the non-loaded return path; a plurality of rolling elements accommodated in a rolling-element circulation path including the loaded rolling-element rolling groove of the moving member body; and a damping member, provided at the moving member body, having a surface facing a surface of the raceway member, the surface of the damping member being set to be in contact with the raceway member or set such that a gap between the surface of the damping member and the raceway member is set to be as close to zero as possible, in which, when the moving member body vibrates relative to the raceway member in a crossing direction crossing a longitudinal direction of the raceway member, the surface of the damping member and the surface of the raceway member are in contact with each other to make the moving member body damped from vibrating relative to the raceway member in the crossing direction.

Further, in the motion guided device described above, the damping member is formed integrally with the moving member body by using a material same as a material of the moving member body.

Still further, in the motion guided device described in the paragraphs above, an oil groove may be formed on the surface of either the damping plate or the damping member, the oil groove accepting oil for reducing friction resistance caused when the moving member body moves along the longitudinal direction of the raceway member.

Additionally, in the motion guided device described in the paragraphs above, the moving member body may be formed as a whole into a saddle shape to have a central part facing an upper surface of the raceway member and a pair of stem parts disposed on respective width-directional ends of the central part to face side surfaces of the raceway member respectively, and the damping plate or the damping member may be provided at the central part of the moving member body.

Further, a motion guided device includes: a raceway member having a rolling-element rolling groove formed thereon; a moving member body having a loaded rolling-element rolling groove formed facing the rolling-element rolling groove and having a non-loaded return path formed thereon; a cover member attached to each of both ends of the moving member body in a traveling direction thereof and having a direction changing path formed connecting the loaded rolling-element rolling groove and the non-loaded return path; a plurality of rolling elements accommodated in a rolling-element circulation path including the loaded rolling-element rolling groove of the moving member body; a damping plate, provided at the moving member body, having a surface facing a surface of the raceway member; and a gap adjustment plate, provided at the moving member body, for adjusting a gap between the damping plate and the raceway member.

Also, in the motion guided device described above, the moving member body and the gap adjustment plate have matching surfaces given gradients, respectively, and the gap between the damping plate and the raceway member is adjusted by moving the gap adjustment plate relative to the moving member body.

Also, the motion guided device described above, further includes: a pair of holding plates attached to both ends of the moving member body in a traveling direction thereof; pressing means, provided at the moving member body, for pressing the gap adjustment plate against the holding plate in the traveling direction; and fixing means, provided at the moving member body, for fixing both the damping plate and the gap adjustment plate to the moving member body.

Additionally, the motion guided device described above, further includes: damping-plate pressing means, provided at the moving member body, for pressing the damping plate in a direction opposite to a direction along which the fixing means pulls the damping plate.

Additionally, the disclosure includes a method of assembling a motion guide device having rolling elements movably arranged between a raceway member and a moving member body, a damping plate, provided at the moving member body, having a surface facing a surface of the raceway member and a gap adjustment plate, provided at the moving member body, for adjusting a gap between the damping plate and the raceway member, wherein the method includes: a gap adjusting step of adjusting the gap between the damping plate and the raceway member by moving the gap adjustment plate having a matching surface given a gradient relative to the moving member body having a matching surface given a gradient, in a traveling direction of the moving member body; and a fixing step of after the gap adjusting step, fixing both the damping plate and the gap adjustment plate to the moving member body.

In the method described above, between the gap adjusting step and the fixing step, a damping-plate pressing step pressing the damping plate in a direction opposite to a direction along which the damping plate is pulled when the damping plate is fixed to the moving member body.

When vibration occurs from the raceway member or the moving member, the surface of the raceway member and the surface of the damping plate make contact with each other. Hence, the spring constant of the motion guide device in a direction crossing the longitudinal direction of the raceway member, for example, in a perpendicular-to-axis direction, changes thereby improving damping performance against vibration occurring in the perpendicular-to-axis direction. Therefore, for example, when this motion guide device is used in a machine tool, it is possible to avoid degrading of a machined surface and also to prevent the lifetime of the tool from shortening excessively.

The moving member body is inserted along the raceway member with the damping plate assembled together. When, the surface of the damping plate is made to be in contact with the raceway member or is set such that a gap between this surface and the raceway member is as close to zero as possible, the damping plate and the raceway member may interfere with each other, making the insertion extremely difficult. However, the gap adjustment plate may be capable of adjusting the width of the gap between the damping plate and the raceway member, so that the work for inserting the moving member body along the raceway member can be made easier. Specifically, when the moving member body is inserted along the raceway member, a gap is produced between the raceway member and the damping plate. After the insertion is completed, the raceway member and the damping plate are made to be in contact with each other again.

By moving the gap adjustment plate relative to the moving member body, the gap between the damping plate and the raceway member can be adjusted in its width.

Whenever vibration is generated from the raceway member or the moving member, the surface of the raceway member and the surface of the damping member make contact with each other. Thus, the spring constant of the motion guide device in a direction crossing the longitudinal direction of the raceway member, e.g., the perpendicular-to-axis direction, is changed so that damping performance in the perpendicular-to-axis direction is improved. Therefore, for example, when this motion guide device is used in a machine tool, it is possible to avoid degrading of a machined surface and also to prevent the lifetime of the tool from shortening excessively.

It may be possible that the damping member is made of a material which is the same as that of the moving member.

The production of an oil groove into which oil is fed makes it possible to prevent a seizure from occurring between the damping plate and the raceway member due to an increase in the resistance against sliding motions between the damping plate and the raceway member.

When the spring constant of the linear guide in the radial direction and the reverse radial direction of the moving block changes, which damps vibration occurring in both the radial direction and the reverse radial direction.

The gap adjustment plate can be used to flexibly change the gap between the damping plate and the raceway member. Hence, the work of inserting the moving member body along the raceway member can be facilitated. Specifically, the moving member body can be inserted along the raceway member with a gap produced between the raceway member and the damping plate, and then the raceway member and the damping plate are again made to be in contact with each other. In addition to this feature, it is possible to change the width of the gap between the damping plate and the raceway member thereby to adjust the damping effect itself. Accordingly, the above can be applied to not only a contact-type damping guide but also a guide apparatus having the capability of damping vibration with use of oil films.

Further, moving of the gap adjustment plate relative to the moving member body allows the damping plate to shift upward or downward, because gradients are given to the moving member body and the gap adjustment plate, respectively. This makes it possible to adjust the width of the gap between the damping plate and the raceway member.

When the pressing means is used to push the gap adjustment plate in the traveling direction of the moving block, the damping plate is shifted upward or downward to adjust the gap between the damping plate and the raceway member. This adjustment can be followed by fixing the damping plate to the moving member body by the fixing means.

If the gap adjustment plate is pushed by the pressing means to adjust the gap and then, the damping plate is fixed to the moving member body with the use of the fixing means, there may occur a situation in which the adjustment is obliged to be repeated many times for an excessively larger gap made due to the fact that the damping plate is pulled toward the moving member body. However, the above solves such a difficulty. That is, as the damping-plate pressing means operates to prevent the damping plate from being pulled by the fixing means, the gap is prevented from being larger excessively. Therefore, it is possible to set the gap in a stable manner and to lessen man-hours for the adjustment.

Use of the pressing means to push the gap adjustment plate in the traveling direction of the moving block enables the damping plate to shift upward or downward, which adjusts the width of the gap between the damping plate and the raceway member. Then, by using the fixing means, the damping plate can be fixed to the moving member body.

In the damping-plate pressing step, the damping plate is not pulled when the damping plate is fixed to the moving member, resulting in preventing the gap from being larger excessively. Hence, the gap is set to be stable and man-hours for the adjustment are decreased.

BRIEF DESCRIPTION OF THE DRAWINGS

FIGS. 7(A) and 7(B) are views each showing a holding plate (FIG. 7(A) is a frontal view and FIG. 7(B) is a plane view);

FIGS. 8(A) and 8(B) are views each showing the gap adjustment plate (FIG. 8(A) is a plane view and FIG. 8(B) is a side view);

BRIEF DESCRIPTION OF REFERENCES

Figure 1:
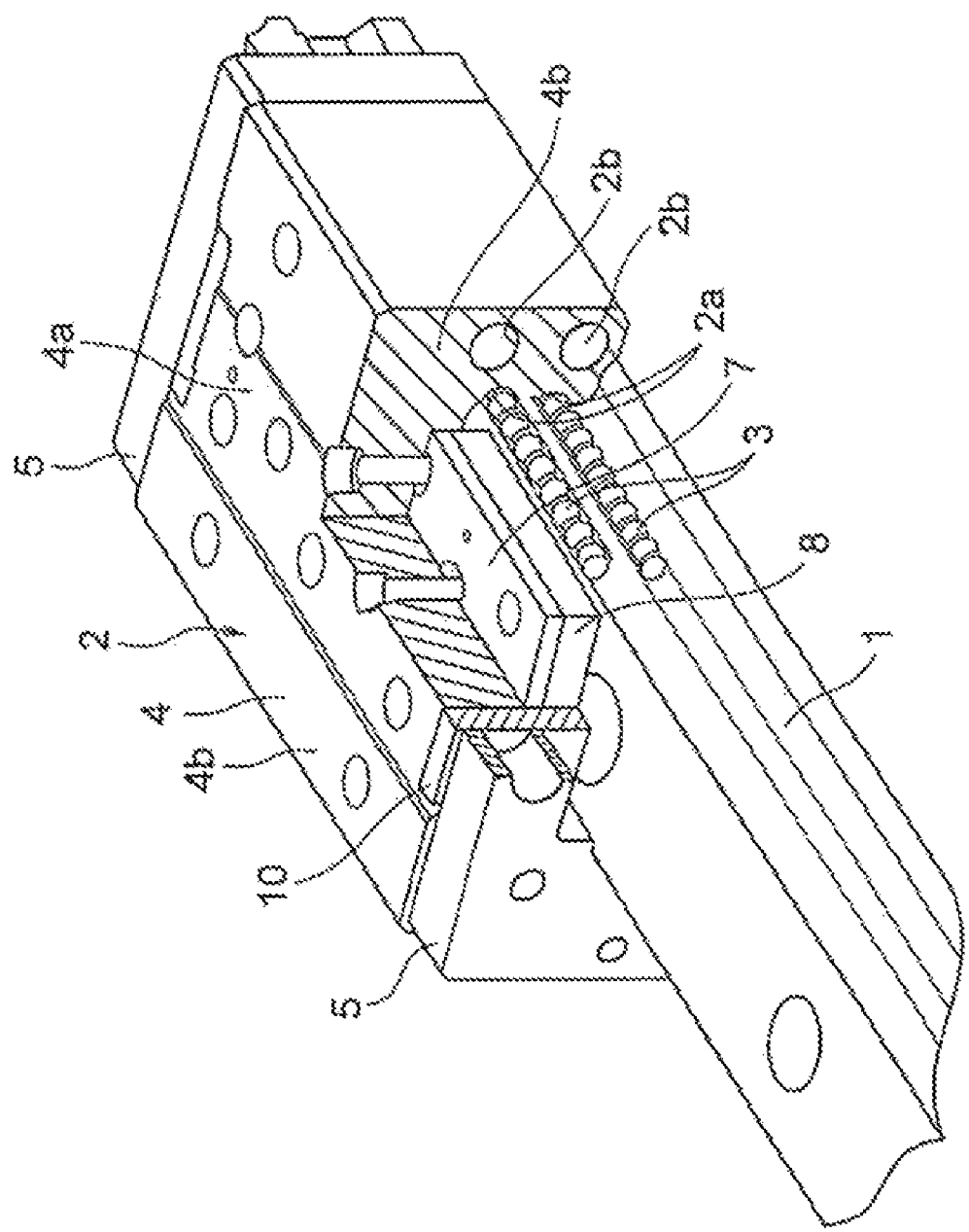
FIG. 1 is a perspective view (partly, including a sectional view) showing a motion guide device according to an embodiment of the present invention.

1 . . . raceway rail (raceway member)
1a . . . ball rolling groove (rolling-element rolling groove)
2 . . . moving block (moving member)
2a . . . loaded ball rolling groove (loaded rolling-element rolling groove)
2b . . . non-loaded return path
3 . . . ball (rolling element)
4,16 . . . moving block body (moving member body)
4a . . . central part
4b . . . stem part
4c,7a . . . matching surface
5 . . . end plate (cover member)
7 . . . gap adjustment plate
8,15 . . . damping plate 8b . . . oil groove
9 . . . fixing bolt (fixing means)
10 . . . holding plate
11 . . . pushing screw (pressing means)
12 . . . pushing screw (damping-plate pressing means)
16a . . . damping member

BEST MODES FOR CARRYING OUT THE INVENTION

Motion guide devices, which guide moving members subjected to linear motions or curvilinear motions, are used in various industrial fields, such as robots for work delivering or assembling parts, apparatuses for manufacturing semiconductor devices or liquid crystal display devices, and working machines. Of such motion guide devices, a rolling-type motion guide device has a guide portion in which rolling elements, such as balls or rollers, are placed to roll, thereby performing a guide motion.

FIG. 1 shows a motion guide device according to an embodiment of the present invention. The motion guide device according to the embodiment is called a linear guide, in which rolling motions of balls guide the linear motions of a moving object. The linear guide has a long and thin raceway rail 1, serving as a raceway member, which extends straight and a saddle-shaped moving block 2, serving as a moving member, which is assembled with the raceway rail 1 slidably relative to the raceway rail. Between the raceway rail 1 and the moving block 2, a large number of balls 3 are placed to roll therebetween.

The raceway rail 1 is formed to have an approximately rectangular section, and, at respective upper parts of side surfaces and both ends of the upper surface of the raceway rail 1, there are formed, totally, four ball rolling grooves 1a which serve as rolling-element rolling grooves. Each of the ball rolling grooves 1a extends along a longitudinal direction of the raceway rail 1 and has a cross section shaped like either a circular-arc groove contour consisting of a single circular arc or a Gothic-arch groove contour consisting of two circular arcs.

The moving block 2 is formed as a whole into a saddle shape and composed of a steel-made moving block body 4 serving as a moving member body and resin-made end plates 5, each serving as a cover member, which are arranged at respective ends in a traveling direction of the moving block body 4. On the moving block 4, there are formed loaded ball rolling grooves 2a serving as loaded rolling-element rolling grooves and facing the ball rolling grooves 1a of the raceway rail 1 respectively and non-loaded return paths 2b extending in parallel with the loaded ball rolling grooves 2a respectively. Similarly to the ball rolling grooves 1a of the raceway rail 1, each of the loaded ball rolling grooves 2a is also formed to have either a circular-arc groove contour consisting of a single circular arc or a Gothic-arch groove contour consisting of two circular arcs. Further, the moving block body 4 has a central part 4a facing the upper surface of the raceway rail 1 and stem parts 4b, 4b extending from the respective width-directional ends of the central part 4a downward and facing the right and left side surfaces of the raceway rail 1.

On each of both end surfaces of the moving block body 4 in the traveling direction thereof, an R-piece portion is formed integrally with the surface, in which the R-piece composes an inner circumferential-side portion of a U-shaped direction changing path that connects the loaded ball rolling groove 2a and the non-loaded return path 2b. Meanwhile, on each of the resin-made end plates 5 attached to both ends of the moving block body 4 in the traveling direction thereof, an outer circumferential-side portion of the direction changing path is formed. A loaded ball rolling path between the ball rolling groove 1a and the loaded ball rolling groove 2a, the non-loaded return path 2b extending in parallel with the loaded ball rolling path, and the U-shaped direction changing paths each linked with ends of both the loaded ball rolling path and the non-loaded return path compose a circular ball circulating path.

The circular ball circulating path accommodates a large number of balls 3 arrayed therein. In the present embodiment, the large number of balls 3 is rotatably held with a support band 24. A spacer is present between every two of the balls 3 to avoid the balls from being in contact with each other and the spacers are held in series by a flexible belt.

Moving the moving block 2 relative to the raceway rail 1 in the axial direction enables the balls 3 to be subjected to rolling motion in the loaded rolling path while taking load. In association with the rolling motion of the balls in this loaded range, the serially linked balls 3 in the non-loaded range are allowed to move in the ball circulating path, whereby all the balls 3 circulate in the ball circulating path.

One feature of the present embodiment is that two parts, i.e., a gap adjusting plate 7 and a damping plate 8 are assembled between the moving block 2 and the raceway rail 1. The gap adjustment plate 7 and damping plate 8 are fixedly secured to the moving block body 4, in which a surface of the damping plate 8 facing the raceway rail 1 (i.e., a lower surface) is made to be in contact with the raceway rail 1 or a gap between the surface of the damping plate 8 and the raceway rail 1 is as close to zero as possible. Additionally the surface of the damping plate 8 facing the raceway rail 1 and a surface of the raceway rail 1 are parallel with each other.

Figure 2:
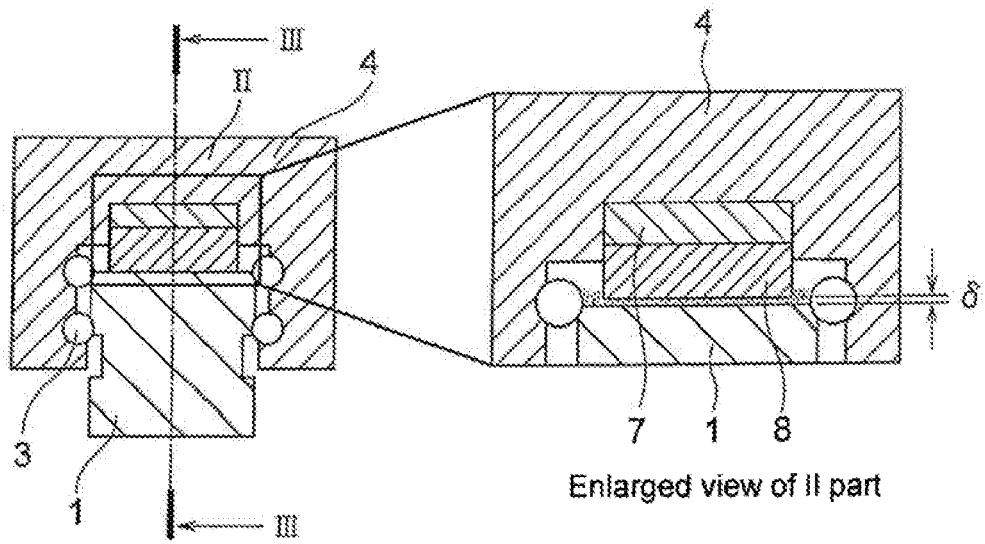
FIG. 2 is a sectional view in a direction perpendicular to the axial direction of the motion guide device.
Figure 3:
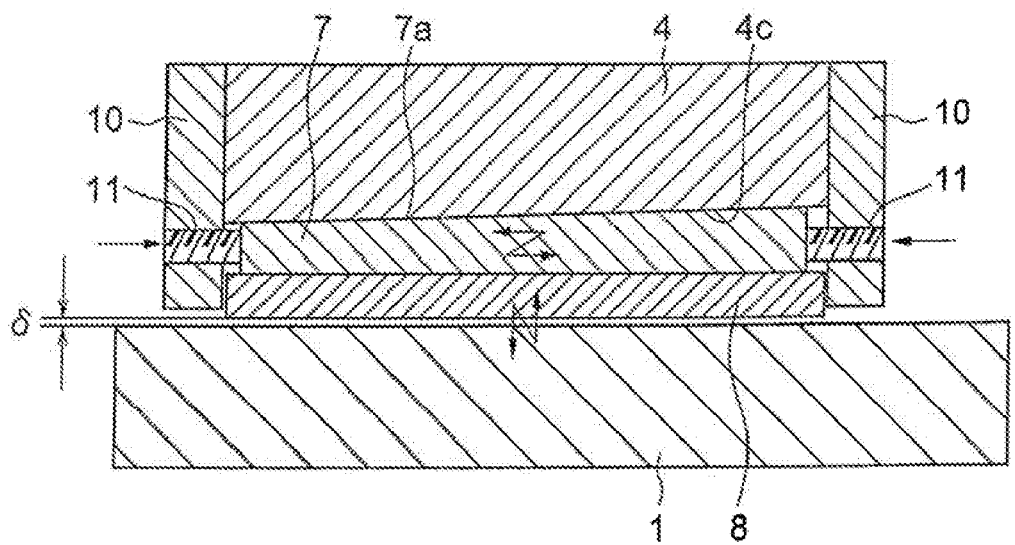
FIG. 3 is a sectional view taken along a III-III line shown in FIG. 2.

The gap between the damping plate and raceway rail is now detailed. FIGS. 2 and 3 represent the gap adjustment plate 7 and the damping plate 8 which are disposed between the moving block body 4 and the raceway rail 1. Contact made between the damping plate 8 and the raceway rail 1 means that the damping plate 8 and the raceway rail 1 are faced with a negative gap therebetween. In this case, the damping plate 8 and the raceway rail 1 are always in contact with each other even during stroke operations and processing operations. In FIGS. 2 and 3, for the sake of easier understanding, the gap δ is illustrated to have a considerably larger amount, but in effect the damping plate 8 and the raceway rail 1 are in contact with each other.

Figure 4A:
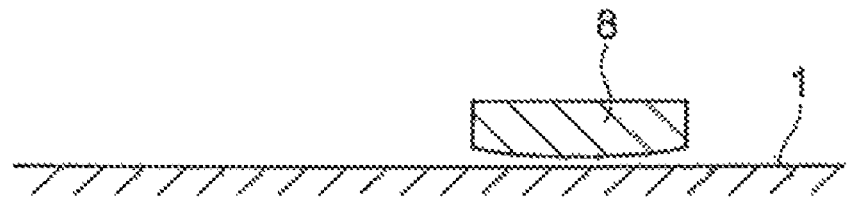
FIGS. 4(A) and 4(B) are axial sectional views each showing a raceway rail and a damping plate (FIG. 4(A) shows the raceway rail which is straight, while FIG. 4(B) shows the raceway rail which is undulates)
Figure 4B:
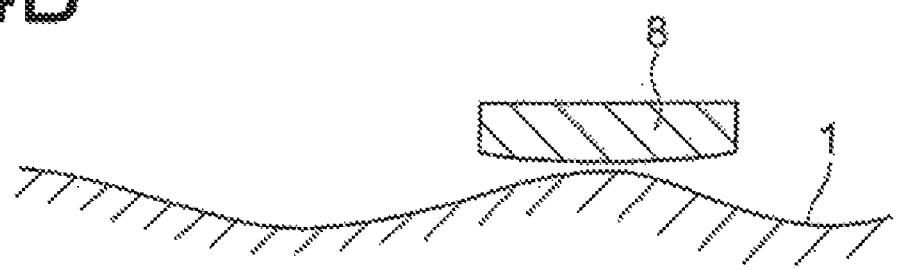

On the other, the gap δ between the damping plate 8 and the raceway rail 1 may be set to be as close to zero as possible. As shown in FIG. 4(A), it is preferred that the surface of the raceway rail 1 is manufactured to be complete flat, while as shown in FIG. 4(B), the raceway rail 1 may be manufactured to an undulation of no less than 10 μm. On top of it, the surfaces of the moving block body 4 and the damping plate 8 are often manufactured to have an undulation of a few micrometers or thereabouts. Thus, even when the gap between the damping plate 8 and the raceway rail 1 is set to be zero at positions where the raceway rail 1 exhibits the highest undulation, there is left a gap of 10 μm or thereabouts at positions where the raceway rail 1 exhibits the lowest undulation. Such a case is also included in "setting the gap δ to be as close to zero as possible".

In the present invention, the gap between the damping plate 8 and the raceway rail 1 is set to certainly secure a contact between the damping plate 8 and the raceway rail 1 when the moving block 2 or the raceway rail 1 vibrates in a perpendicular-to-axis direction. The reason is that the present invention relates to a technique for damping vibration in the perpendicular-to-axis direction of either the moving block 2 or the raceway rail 1 by making the damping plate 8 contact the raceway rail 1, in cases where the moving block 2 or the raceway rail 1 causes vibration in the perpendicular-to-axis direction. For example, it is supposed that, while a machine tool processes a workpiece under predetermined processing conditions, vibration occurs at a point where the process is made, and the vibration is transmitted to the motion guide device to cause the moving block 2 or the raceway rail 1 to vibrate in the perpendicular-to-axis direction. Even in such a case, the gap δ is determined to secure mutual contact between the damping plate 8 and the raceway rail 1.

When the raceway rail 1 or the moving block 2 vibrates, the surface of the raceway rail 1 and the surface of the damping plate 8 are in contact with each other in a surface-to-surface manner. This gives changes to a spring constant of the motion guide device in the perpendicular-to-axis direction (i.e., a radial direction and a reverse-radial direction) of the raceway rail 1, thus improving damping performance against vibration in the perpendicular-to-axis direction. In consequence, even when the motion guide device is used in for example a machine tool, it is possible to prevent occurrence of the problems of degrading of a machined surface and shortening of the life of the tool. Experiments showed that problematic vibration occurring at processing points by a machine tool was, rather than rough cutting work, finishing cutting that uses smaller processing forces and smaller processing amplitudes.

The moving block 2 is inserted along the raceway rail 1 with the damping plate 8 mounted therein, so that making of the surface of the damping plate 8 in contact with the raceway rail 1 or setting of the gap between the surface and the raceway rail 1 to be as close to zero as possible will cause interference between the damping plate 8 and the raceway rail 1, resulting in a problem of making the insertion difficult. To overcome this problem, the gap adjustment plate 7 to adjust the gap δ between the damping plate 8 and the raceway rail 1 is arranged between the moving block body 4 and the damping plate 8, as shown in FIGS. 2 and 3. When the moving block 2 is inserted along the raceway rail 1, the gap between the raceway rail 1 and the damping plate 8 is given by using the gap adjustment plate. After the insertion is completed, the gap adjustment plate 7 is operated to adjust the gap so as to allow the raceway rail 1 and the damping plate 8 to come into contact with each other.

As shown in FIG. 3, the moving block body 4 and the gap adjustment plate 7 have matching surfaces 4c and 7a, respectively, and a gradient is given to each of the matching surfaces. Namely, both matching surfaces 4c and 7a are tapered at the same angle, respectively. The damping plate 8 is securely fixed to the moving block body 4 by means of joint means such as joint bolts with the gap adjustment plate 7 sandwiched between the damping plate 8 and the moving block body 4. With the joint between the moving block body 4 and the damping plate 8 loosened, pressing means such as pushing screws are handled to push the gap adjustment plate 7 from both sides thereof located in the traveling direction of the moving block 2. The pushing operations allow the gap adjustment plate 7 to move relative to the moving block body 4. Because the matching surfaces 4c and 7a of the moving block body 4 and the gap adjustment plate 7 are given the gradients, moving the gap adjustment plate 7 will cause the damping plate 8 to move up or down. For example, a movement of the gap adjustment plate 7 leftward in the figure causes the damping plate 8 to come down to narrow the gap, while a movement of the gap adjustment plate 7 rightward in the figure causes the damping plate 8 to come up to enlarge the gap.

Figure 5B:
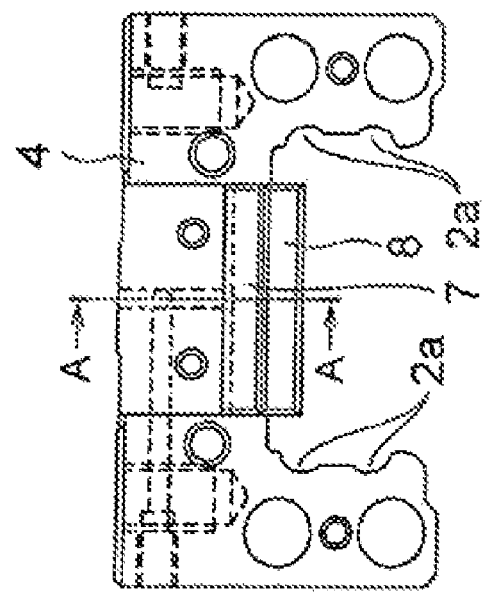
FIGS. 5(A) and 5(B) are views each showing a moving block body in which a gap adjustment plate and the damping plate are engaged with each other (FIG. 5(A) is a sectional view and FIG. 5(B) is a frontal view)
Figure 5A:
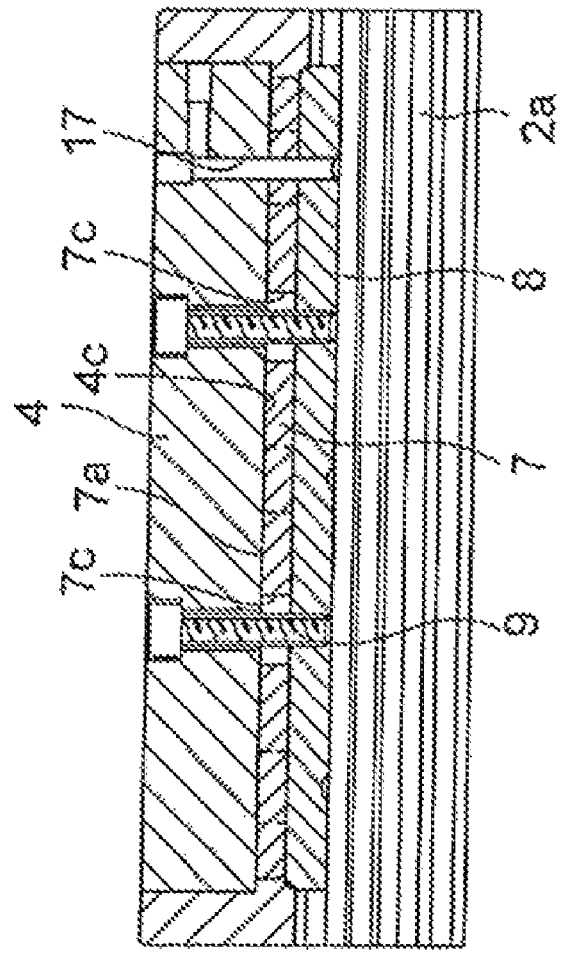

Each of the foregoing components is now detailed. FIGS. 5(A) and 5(B) each show an assembled state in which the gap adjustment plate 7 and the damping plate 8 are jointed with the moving block body 4. The damping plate 8 and the moving block body 4 are mutually jointed by fixing bolts 9. Bolt passing through-holes 7c whose diameters are larger than the diameter of each fixing bolt 9 are formed through the gap adjustment plate 7, so that the gap adjustment plate 7 is able to move by ±2 mm, in total, 4 mm relatively to the moving block body 4 in the traveling direction. When the matching surfaces of the moving block body 4 and the gap adjustment plate 7 are given, for example, a gradient of 1/100, a stroke of ±2 mm of the gap adjustment plate 7 allows the damping plate 8 to move upward or downward by ±20 μm. If the gap adjustment plate 7 is removed from the device and the damping plate 8 with the gradient on its surface is directly touched to the matching surface 4c of the moving block body 4, it is required that, for securing a stroke of ±2 mm of the damping plate 8, a gap of ±2 mm be produced around the bolt passing through-holes of the moving block body 4. However, producing of such bolt passing through-holes makes it difficult to provide larger amounts to the seating face of each fixing bolt 9, resulting in a shortage in the joint force of the fixing bolts 9. As a result, the gap adjustment plate 7 is used to intervene therebetween to allow the bolt passing through-holes 7c to provide the gap adjustment plate 7 with a gap of ±2 mm or more.

Figure 6A:
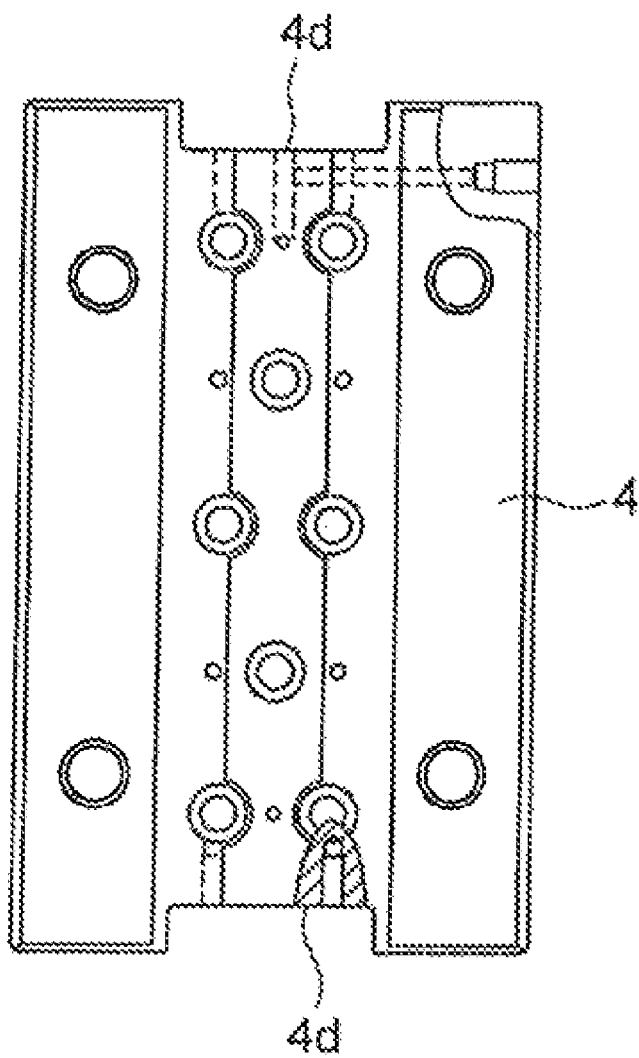
FIGS. 6(A) and 6(B) are views each showing the moving block body (FIG. 6(A) is a plane view and FIG. 6(B) is a frontal view)
Figure 6B:
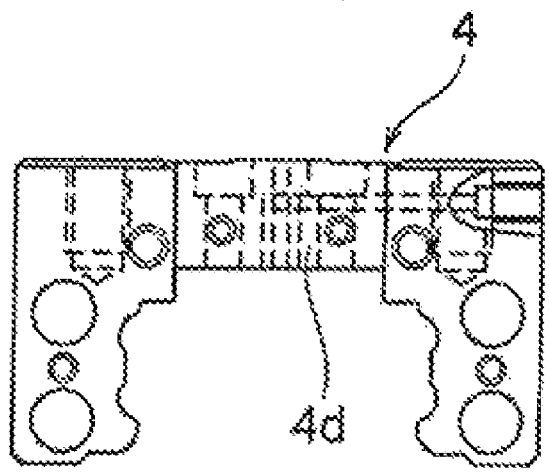

As shown in FIGS. 6(A) and 6(B), notches 4d are produced at both ends of the moving block body 4 in its traveling direction. Into these notches 4d, holding plates 10 shown in FIGS. 7(A) and 7(B) are fit. Bolt passing through-holes 10a are produced through each holding plate 10 for securing this holding plate 10 to the moving block body 4 and internal threads 10b screwed with pushing screws 11 (refer to FIG. 3) are formed on each holding plate 10.

FIGS. 8(A) and 8(B) each show the gap adjustment plate 7. The matching surface 7a of this gap adjustment plate 7 directly facing the moving block body 4 is given a gradient of for example 1/100, as described above. Likewise, the matching surface 4c of the moving block body 4 is given a gradient that is equal to that given to the matching surface 7a of the gap adjustment plate 7. These matching surfaces 4c and 7a are formed into planes. In contrast, no gradient is given to a matching surface 7b of the gap adjustment plate 7 facing the damping plate 8.

Figure 9A:
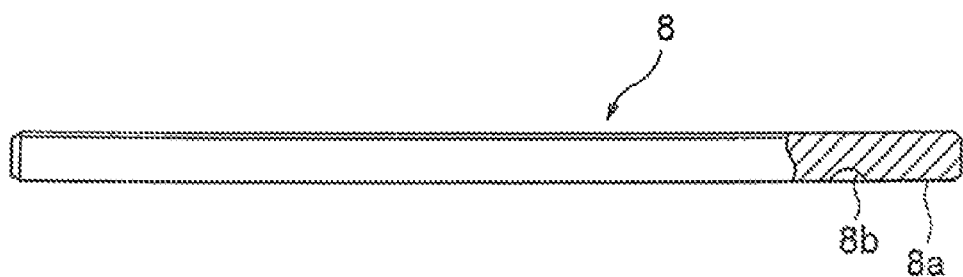
FIGS. 9(A) and 9(B) are views each showing the damping plate (FIG. 9(A) is a side view and FIG. 9(B) is a bottom view)
Figure 9B:
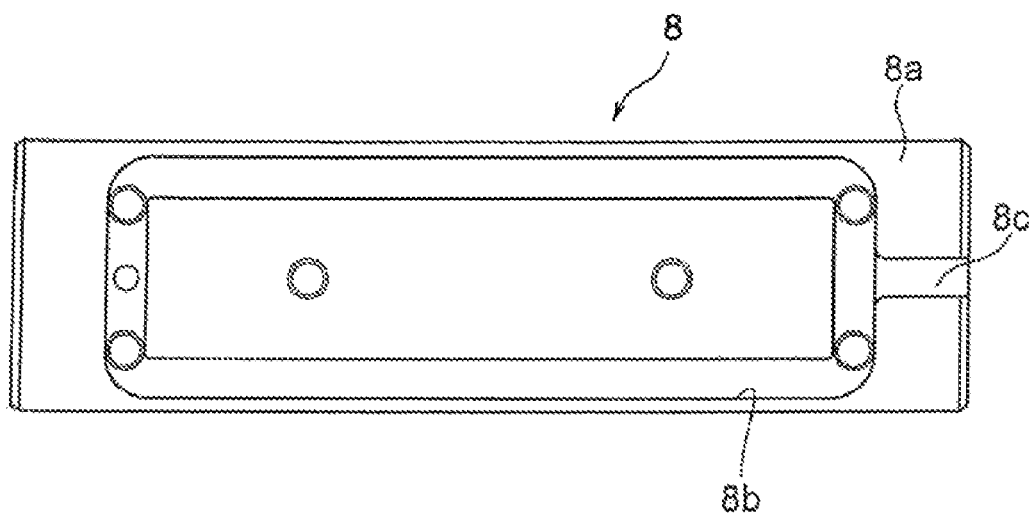

FIGS. 9(A) and 9(B) each show the damping plate 8. In the present invention, the damping plate 8 is made to contact the raceway rail 1, which enables damping of vibration in the direction perpendicular to the axis of the moving block. If the damping plate 8 is almost rigid, the plate 8 behaves like a spring. As a result, the amplitude of vibration can be reduced down to smaller amounts, but it may be difficult to gain a sufficient damping effect. In view of this drawback, the damping plate 8 is made of resin or cast metal such as soft metal. With contacting the raceway rail 1, the damping plate 8 travels along the axial direction of the raceway rail 1. The contact between metal members will cause a very larger amount of resistance, which may lead to a fear that the damping plate 8 is seized. To prevent the damping plate 8 from seizing, the surface 8a of the damping plate 8 is provided with an oil groove 8b, into which oil for reducing the friction resistance is fed. Into this oil groove 8b, oil is fed from an oil supply path 17 shown in FIG. 5(A). It should be noted here that the damping plate 8 and the raceway rail 1 come into contact with each other. Thus if there is no cryptoporticus for the oil, the pressure of the oil supplied is accumulated to create a gap between the damping plate 8 and the raceway rail 1. Accordingly, the oil groove 8b includes a cryptoporticus 8c reaching a side of the damping plate.

Figure 10:
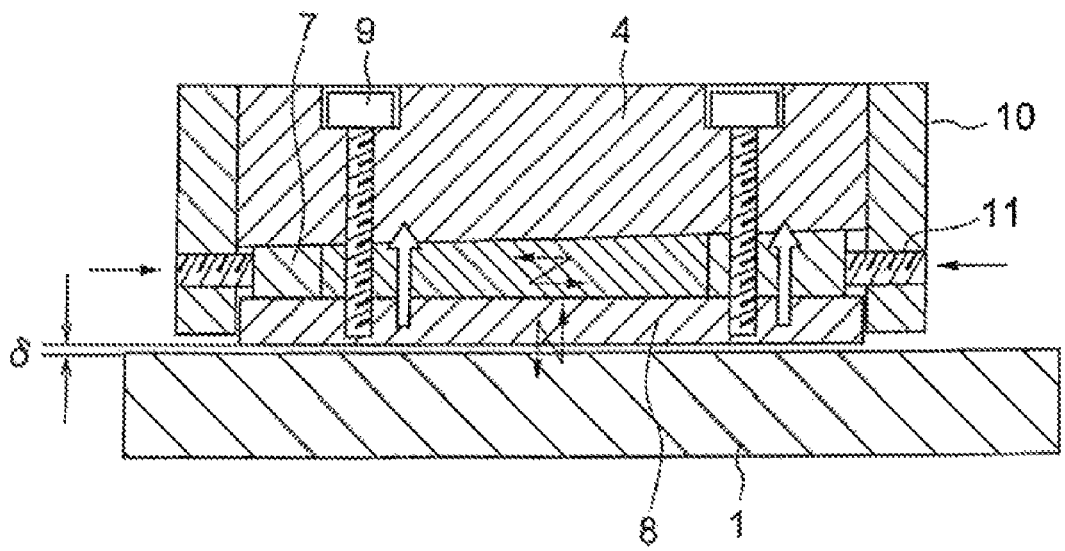
FIG. 10 is a view explaining how to adjust a gap.
Figure 11:
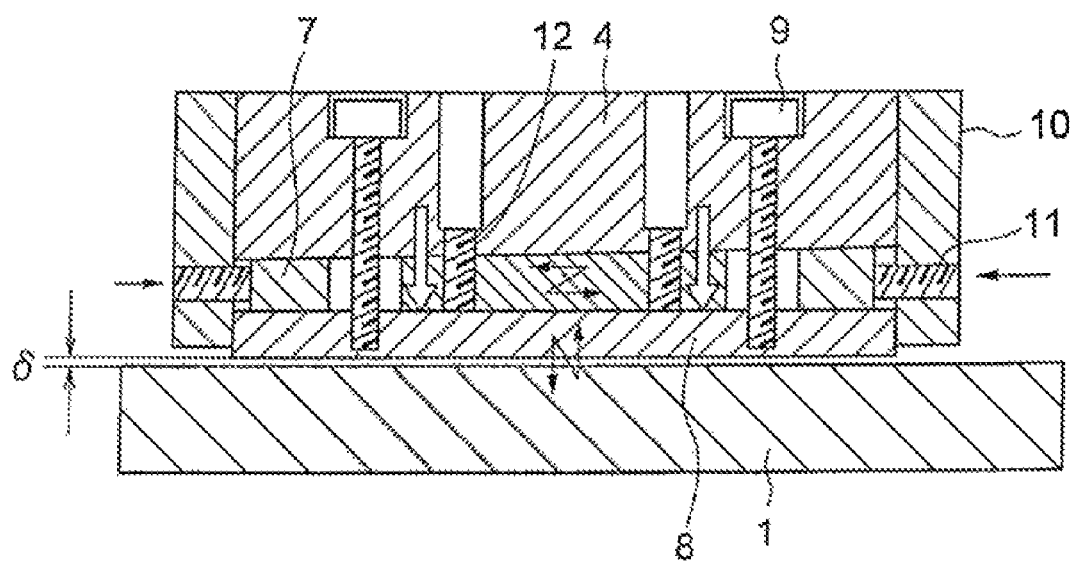
FIG. 11 is a view further explaining how to adjust the gap.

As shown in FIG. 10, when the pushing screws 11 are handled to push the gap adjustment plate 7 to adjust the gap, and then the fixing bolts 9 are handled to fix the damping plate 8 to the moving block body 4 from the upper surface of the moving block body, the damping plate 8 is pulled toward the moving block body 4 to make the gap larger excessively. This may result in that the adjustment should be done repeatedly many times. In view of this drawback, a countermeasure is taken as shown in FIG. 11, in which a damping-plate pushing screw 12 serving as damping-plate pressing means is used to press down the damping plate 8 from the upper surface of the moving block body 4 (in other words, "to prevent the damping plate 8 from being pulled toward the moving block body 4"), and the fixing bolts 9 are then handled to fix the damping plate 8 to the moving block body 4. Hence it is possible to avoid such a phenomenon that the damping plate 8 is pulled by the fixing bolts 9 to make the gap δ enlarged excessively, thereby making the gap δ stable and reducing man-hours for the adjustment.

Figure 12:
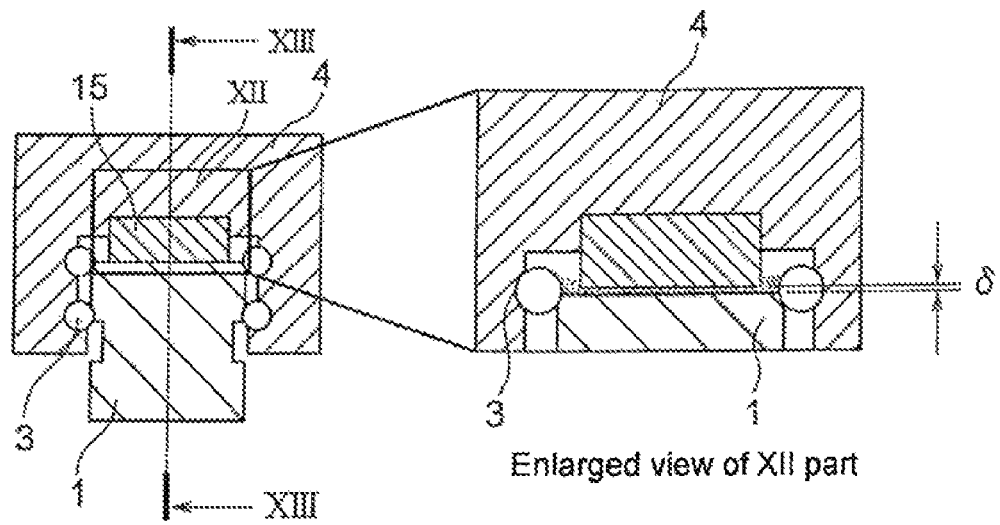
FIG. 12 is a sectional view showing a motion guide device, taken along a direction perpendicular to the axial direction thereof, according to another embodiment of the present invention.
Figure 13:
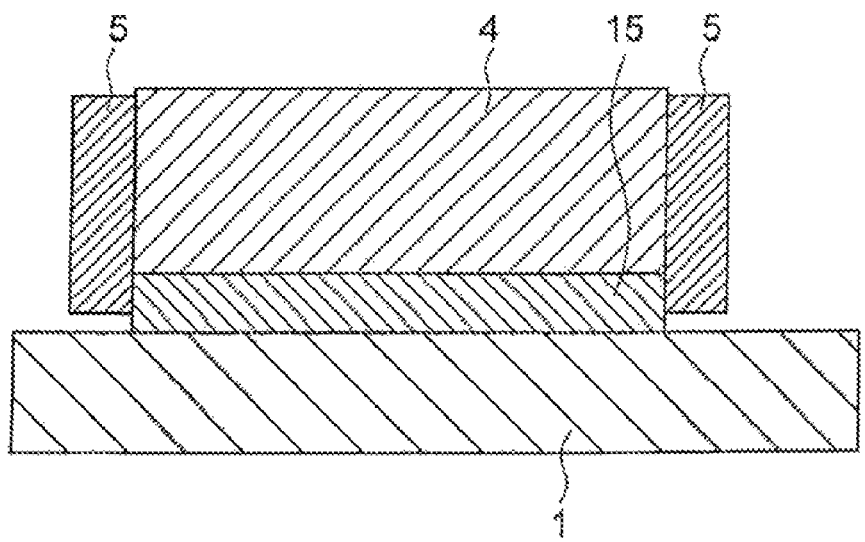
FIG. 13 is a sectional view showing a motion guide device, taken along the axial direction thereof, according to another embodiment of the present invention.

FIGS. 12 and 13 show a motion guide device according to another embodiment of the present invention. In the present embodiment, no gap adjustment plate is provided and the damping plate 15 is therefore directly secured to the moving block body 4. In the similar way to the motion guide device described above, the lower surface of the damping plate 15 is made to be in contact with the raceway rail 1 or a gap δ formed with the raceway rail 1 is as close to zero as possible. Further, an oil groove, into which oil is fed to prevent seizing, is formed on the lower surface of the damping plate 15. A matching surface of the damping plate 15, which faces the moving block body, may be given a gradient to adjust the width of the gap. Since such components including the moving block body 4 and the raceway rail 1 are similar to those of the motion guide device according to the foregoing embodiment, the identical reference numerals are given to those components to omit the descriptions thereof. In the present embodiment, whenever vibration occurs from the raceway rail 1 or the moving block 2, both surfaces of the raceway rail 1 and the damping plate 15 come into contact with each other. This contact changes the spring constant of the motion guide device in the perpendicular-to-axis direction (i.e., the radial direction and the reverse radial direction) of the raceway rail 1, improving a performance to damp the vibration in the axis-particular direction.

Figure 14:
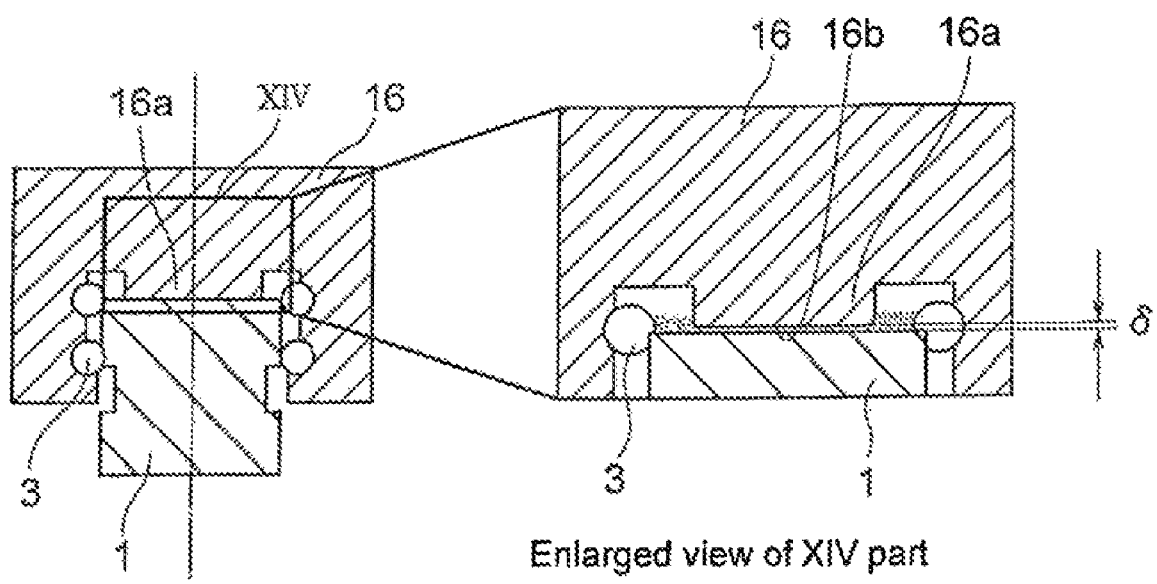
FIG. 14 is a sectional view showing a motion guide device, taken along a direction perpendicular to the axial direction thereof, according to yet another embodiment of the present invention.
Figure 15:
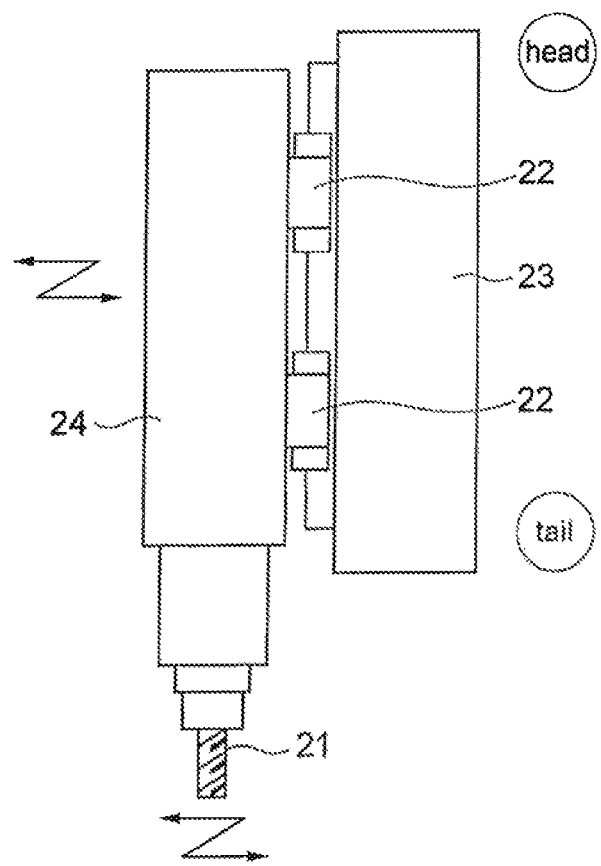
FIG. 15 is a view exemplifying motion guide devices used for the Z-axis of a machining center.
Figure 16:
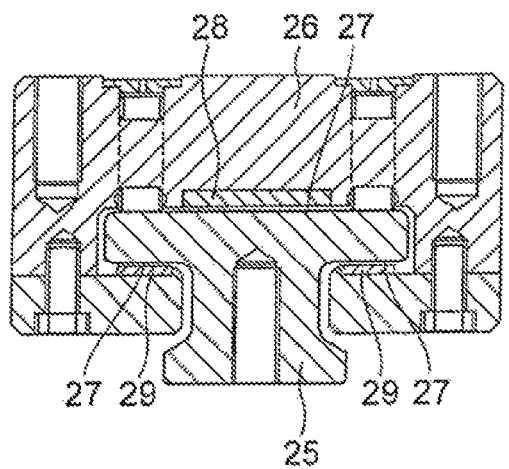
FIG. 16 is a sectional view showing a motion guide device equipped with a conventional squeeze film damper.

FIG. 14 shows a motion guide device according to yet another embodiment of the present invention. In the motion guide device according to this embodiment, the foregoing damping plate is replaced by a damping member 16a which is integral with the moving block body 16 and is made of the same material as that of the moving block body 16. A surface 16b of the damping member 16a, which faces the raceway rail 1, is planar. Similarly to the motion guide device described above, the surface 16b of the damping member 16a is structured such that the surface 16b is in contact with the raceway rail 1 or a gap δ between the surface and the raceway rail 1 is as close to zero as possible. In addition, on the surface 16b of the damping member 16a, there is formed an oil groove into which oil for preventing a seizure is fed. Even in this embodiment, whenever the raceway rail 1 or the moving block 2 vibrates, the surface of the raceway rail 1 and the surface 16b of the damping member 16a come into contact with each other. Accordingly, the spring constant of the motion guide device in the particular-to-axis direction (the radial direction and the reverse radial direction) of the raceway rail 1 is changed, with the result that the damping performance against the vibration in the perpendicular-to-axis direction is improved.

Incidentally, the present invention is not limited to the structures described in the foregoing embodiments, but such structures can be modified into other various forms within the scope of the present invention. For example, the motion guide device according to the present invention is not limited to an application to the Z-axis of a machining center, but may be applied to various apparatuses, such as machine tools, robots, and semiconductor manufacturing apparatuses, provided that perpendicular-to-axis directional vibration may occur from a moving block or a raceway rail of each apparatus. The motion guide device according to the present invention is not limited to be implemented as a saddle-shaped linear guide, but may be implemented as a ball spline.

Moreover, when the gap adjustment plate and the damping plate are used together, the gap between the damping plate and the raceway rail can be changed to adjust the damping effect. To gain such a feature, a gap of a few micrometers to several tens of micrometers is produced between the damping plate and the raceway rail and the gap is charged with oil. This charged oil will generate resistance when the moving block vibrates in the axial direction of the raceway rail. As a result, the invention that employs the gap adjustment plate and the damping plate at the same time can be applied to not only a contact-type damping guide but also a guide apparatus with a damping function on an oil film.

The present specification is based on Japanese Patent Application No. 2005-151472 filed on May 24, 2005, the entire contents of which are expressly incorporated by reference herein.

The invention claimed is:

1. A motion guide device comprising:
   a raceway member having a rolling-element rolling groove formed thereon;
   a moving member body having a loaded rolling-element rolling groove formed facing the rolling-element rolling groove and having a non-loaded return path formed thereon;
   a cover member attached to each of both ends of the moving member body in a traveling direction thereof and having a direction changing path formed connecting the loaded rolling-element rolling groove and the non-loaded return path;
   a plurality of rolling elements accommodated in a rolling-element circulation path including the loaded rolling-element rolling groove of the moving member body;
   a damping plate, provided at the moving member body, having a surface facing a surface of the raceway member;
   a gap adjustment plate, provided at the moving member body, for adjusting a gap between the damping plate and the raceway member;
   a pair of holding plates attached to both ends of the moving member body in a traveling direction thereof;
   pressing means, provided at the moving member body, for pressing the gap adjustment plate against the holding plate in the traveling direction; and
   fixing means, provided at the moving member body, for fixing both the damping plate and the gap adjustment plate to the moving member body,
   wherein the moving member body and the gap adjustment plate have matching surfaces given gradients, respectively, and the gap between the damping plate and the raceway member is adjusted by moving the gap adjustment plate relative to the moving member body.

2. The motion guide device of claim 1 further comprising: damping-plate pressing means, provided at the moving member body, for pressing the damping plate in a direction opposite to a direction along which the fixing means pulls the damping plate.

3. A method of assembling a motion guide device having rolling elements movably arranged between a raceway member and a moving member body, a damping plate, provided at the moving member body, having a surface facing a surface of the raceway member, a gap adjustment plate, provided at the moving member body, for adjusting a gap between the damping plate and the raceway member, a pair of holding plates attached to both ends of the moving member body in a traveling direction thereof, pressing means, provided at the moving member body, for pressing the gap adjustment plate against the holding plate in the traveling direction, and fixing means, provided at the moving member body, for fixing both the damping plate and the gap adjustment plate to the moving member body, the method comprising:

a gap adjusting step of adjusting the gap between the damping plate and the raceway member by moving the gap adjustment plate having a matching surface given a gradient relative to the moving member body having a matching surface given a gradient, in a traveling direction of the moving member body; and a fixing step of after the gap adjusting step, fixing both the damping plate and the gap adjustment plate to the moving member body.

4. The method of claim 3, further comprising, between the gap adjusting step and the fixing step, a damping-plate pressing step pressing the damping plate in a direction opposite to a direction along which the damping plate is pulled when the damping plate is fixed to the moving member body.

* * * * *